United States Patent [19]

Magnet et al.

[11] Patent Number: 5,507,100

[45] Date of Patent: Apr. 16, 1996

[54] PUSH ROD GAUGE

[75] Inventors: Melvin N. Magnet, Whittier; Gerald L. Magnuson, Oxnard, both of Calif.

[73] Assignee: Rivera Engineering, Inc., Whittier, Calif.

[21] Appl. No.: 87,061

[22] Filed: Jul. 7, 1993

[51] Int. Cl.⁶ .................................................. G01D 21/00
[52] U.S. Cl. ........................... 33/603; 33/600; 123/90.61
[58] Field of Search .............................. 33/603, 600, 483, 33/484, 485, 489; 123/90.61, 90.62, 90.64

[56] References Cited

U.S. PATENT DOCUMENTS 2,827,710 3/1958 Campbell ................................. 33/600
5,095,862 3/1992 Murphy ................................ 123/90.61

Primary Examiner—Christopher W. Fulton
Attorney, Agent, or Firm—Edgar W. Averill, Jr.

[57] ABSTRACT

A push rod gauge for finding the optimum length of push rods in a push rod engine. The gauge has a mounting bracket which is affixed to a cylinder head after the rocker arm has been removed, a push rod holding channel is held by the face plate and has measuring marks on its outer surface. A push rod member is placed in the conventional position of a push rod and the cam shaft is turned. The position at which the push rod moves an equal length above and below a zero line mark is noted. A push rod is then adjusted or cut to this preferred length. The device can be used on any engine having push rods.

14 Claims, 5 Drawing Sheets

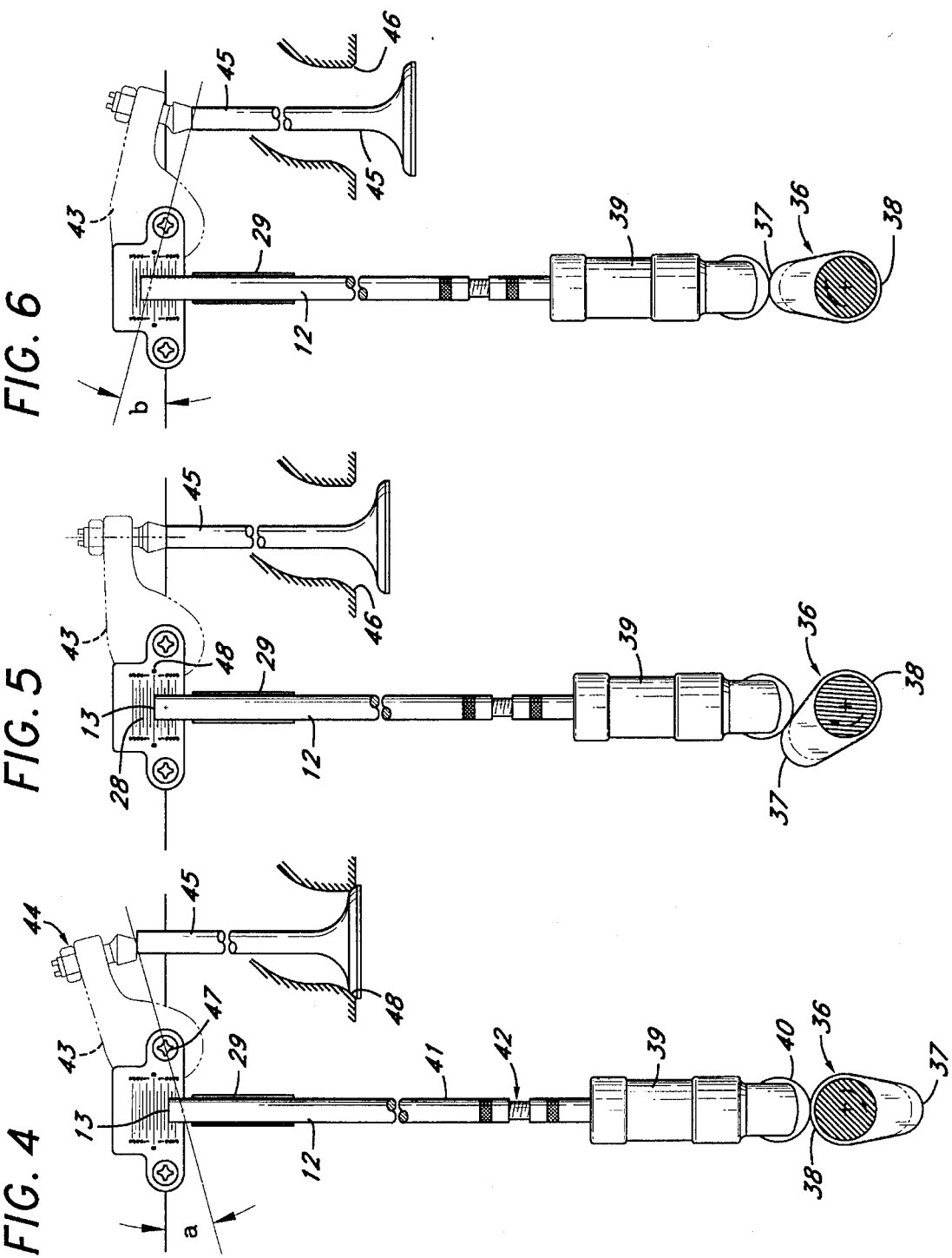

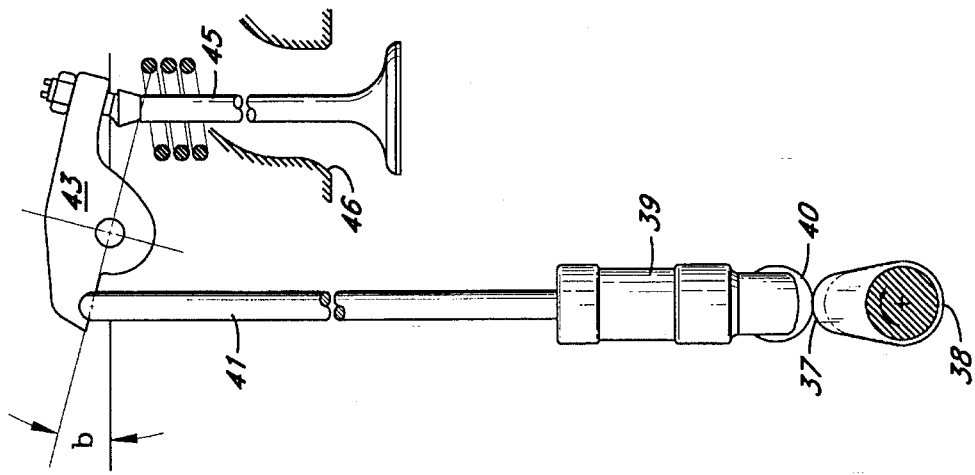
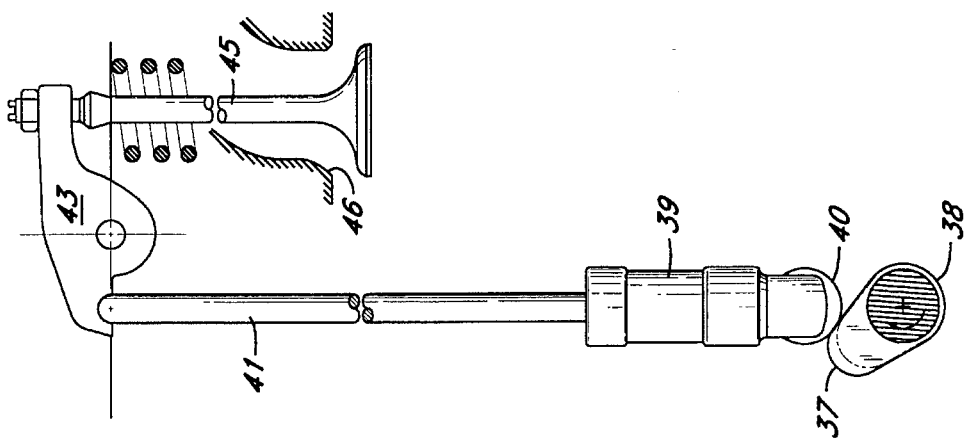
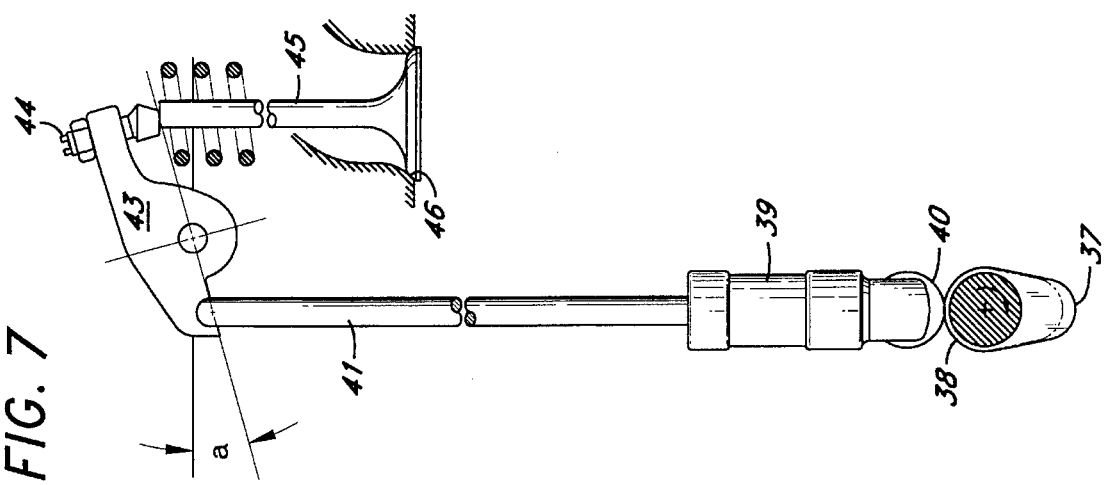

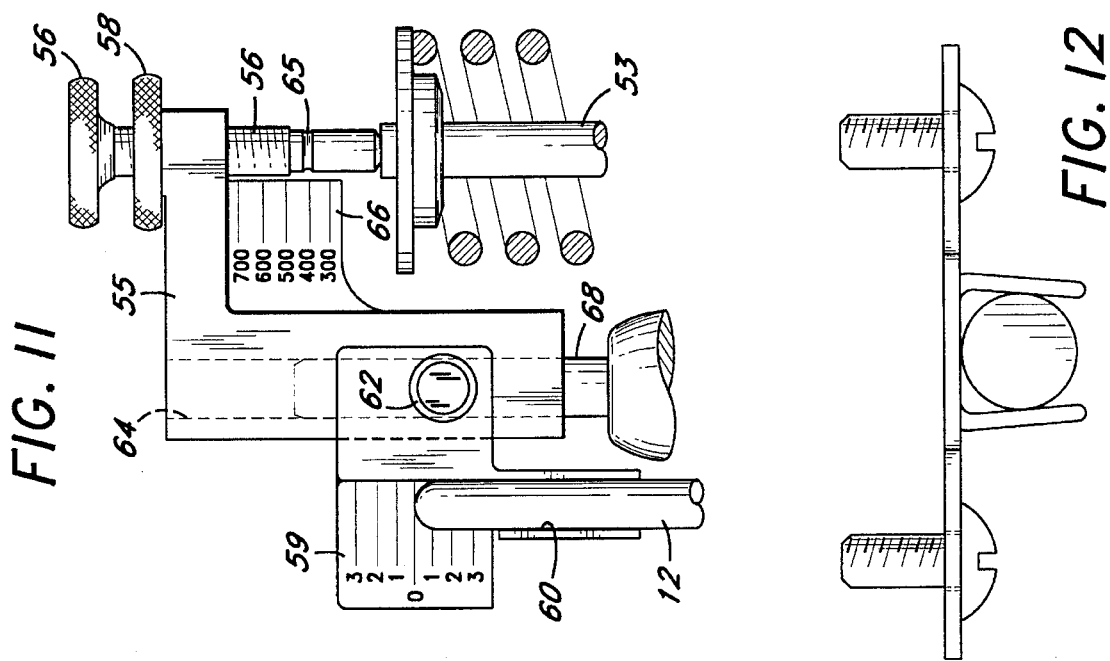
FIG. 11
FIG. 12
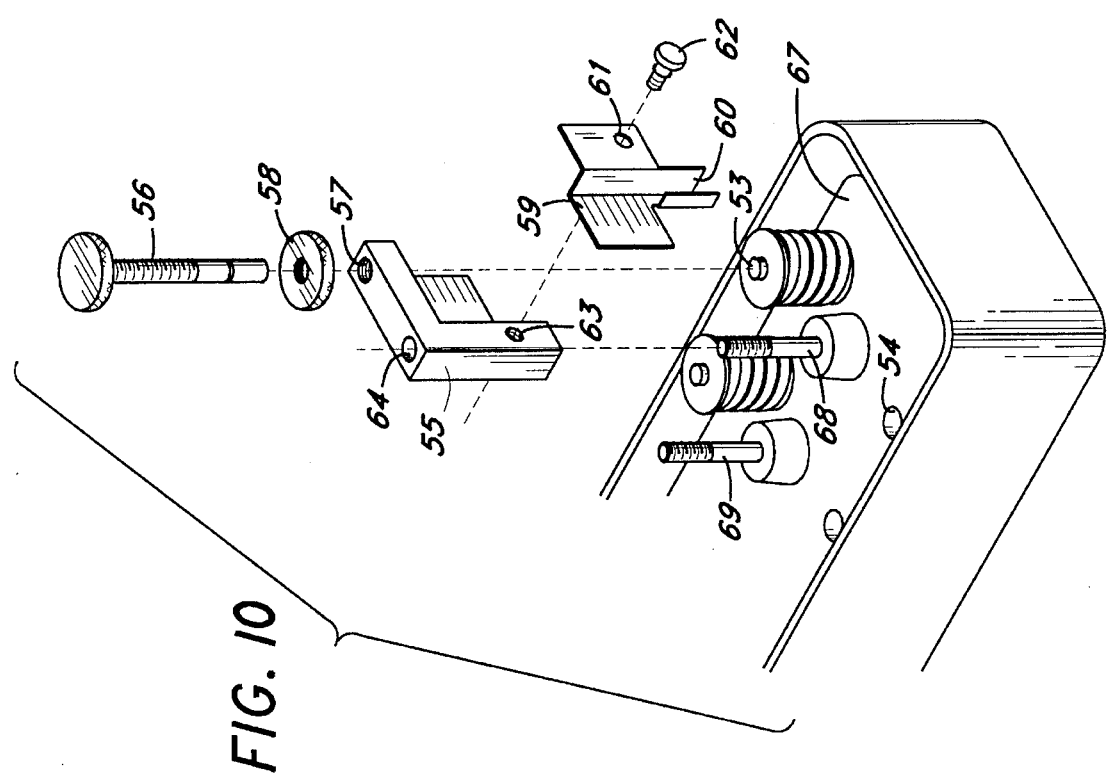
FIG. 10

PUSH ROD GAUGE

BACKGROUND OF THE DISCLOSURE

The field of the invention is internal combustion engines and the invention relates more particularly to tools for determining the optimum length for each push rod in a push-rod engine.

It is important to have push rods of the correct length because engines run better and exhibit less wear when the push rods are the correct length. The valve timing is more precise, the loading on the push rod is less and wear is reduced. Furthermore, the engine will turn a higher RPM and will produce more power as a result of less friction and more precise valve timing.

Engines that have been modified with higher lift cams are much more critical to push rod length and thus, after installing a high lift cam, the optimum push rod length should be determined. In addition to changing cam shafts, adding or removing of gaskets or changing the deck height on the cylinder head also requires a push rod length adjustment. The goal is to have a 90° angle between the rocker arm shaft, center of the push rod ball, and the axis of the push rod, measured at one-half the valve lift.

In the past, it has been very difficult to measure ideal push rod length, and thus, a trial and error method has typically been used which leads to less than perfect results.

SUMMARY OF THE INVENTION

It is an object of the present invention to provide a tool for measuring optimum push rod length.

The present invention is for a push rod gauge for finding the optimum length of push rods for use in push rod engines. The gauge has a mounting bracket which is affixable to a cylinder head from which the rocker arm has been removed. A push rod holding channel is held by the bracket and is of sufficient width to slidingly hold an adjustable gauge rod. Measuring marks are present on the gauge and the push rod length is adjusted so that its upper end moves an equal distance upwardly and downwardly from the zero mark on the gauge. Once the gauge rod length has been determined, then the actual push rod is either cut, adjusted or fabricated to the optimum length. Preferably, the push rod holding channel is held by a separate scale plate which is, in turn, held by the mounting bracket. Also, preferably the scale and mounting bracket each have a pair of holes and the scale plate can be moved without moving the mounting bracket to check the length of an adjacent push rod.

BRIEF DESCRIPTION OF THE DRAWINGS

FIG. 4 is a front view of a push rod with a hydraulic roller tappet shown with the scale plate of FIG. 3 and a valve and rocker arm assembly.

FIG. 5 is a view analogous to FIG. 4 with the push rod at one-half lift.

FIG. 6 is a view analogous to FIG. 4 with the push rod contacting the nose of the cam lobe.

FIG. 7 is a front view of a push rod with a hydraulic roller tappet, a rocker arm and valve assembly with the push rod contacting the heel of the cam lobe.

FIG. 8 is a view analogous to FIG. 7 with the push rod contacting the cam lobe in a one-half lift position.

FIG. 9 is a view analogous to FIG. 7 with the push rod contacting the nose of the cam lobe.

FIG. 10 is an exploded perspective view of the push rod gauge of the present invention configured for use on a pedestal mounted rocker arm.

FIG. 11 is an enlarged front view of the gauge assembly of FIG. 10.

FIG. 12 is a top view of the gauge assembly of FIG. 3, including a push rod.

DESCRIPTION OF THE PREFERRED EMBODIMENT

Figure 1:
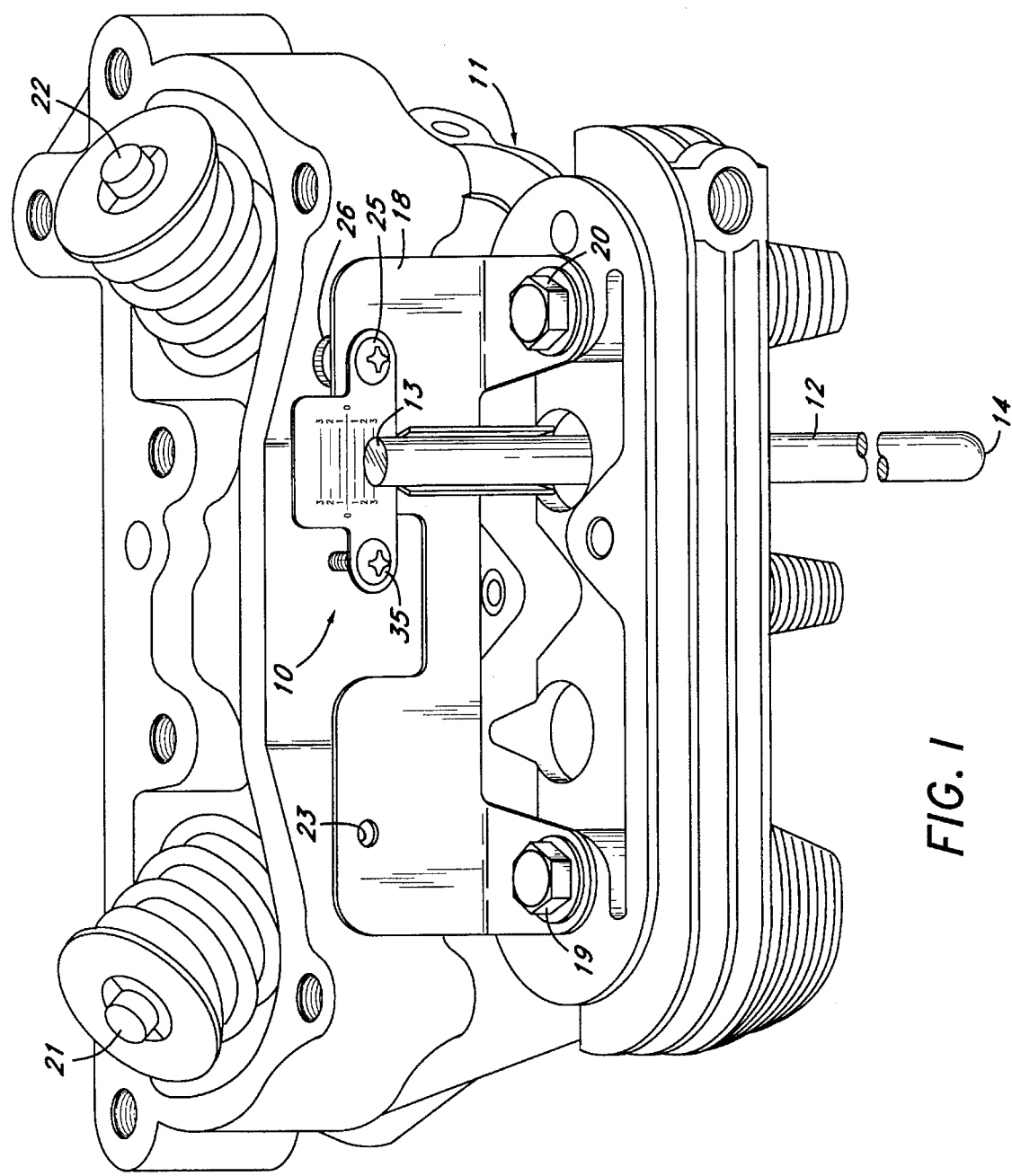
FIG. 1 is a perspective view showing the rear head of a Harley-Davidson motorcycle engine with the rocker boxes removed and including the push rod gauge of the present invention.

The push rod gauge of the present invention is shown in perspective view in FIG. 1 and indicated by reference character 10. Push rod gauge 10 is connected to the rear head 11 of a Harley Davidson motorcycle engine with the rocker box removed. An adjustable gauge rod 12 has a flat upper surface 13 and has a rounded lower surface as shown best in FIG. 2 and indicated by reference character 14. The length of adjustable gauge rod 12 is adjustable in the manner indicated in FIG. 2 by a pair of knurled portions 15 and 16 and a threaded length 17. Of course, the turning of knurled portion 15 with respect to portion 16 can shorten or lengthen rod 12.

Returning to FIG. 1, push rod gauge 10 has a mounting bracket 18 which is secured to head 11 by a pair of cap screws 19 and 20. The upper end of an exhaust valve 21 is shown on the left portion of FIG. 1 and the upper end of an intake valve 22 is shown on the right hand side of FIG. 1. Exhaust valve 21 normally has a rocker arm which pivots about a shaft which has a central axis which is coincident with mounting hole 23. The rocker arm for intake valve 22 pivots about mounting hole 24 shown in FIG. 2 through which a screw 25 and a thumb nut 26 is held. Bracket 18 is supported by a pair of tabs 18' formed at about a right angle with respect to the vertical portion of the bracket. It is also preferable upwardly extending portion 50 be angled toward tabs 18' so that ears 51 and 52 can be vertical. An angle "C" (FIG. 2) is preferably about 10 degrees. This assures that the channel 29 will not rub against the upwardly extending portion 50 of mounting bracket 18. It is also important to note that the depth of push rod holding channel 29 is sufficient so that push rods which are at an angle which is not parallel to upwardly extending portion 50 may be still accommodated. The channel, however, still holds the scale 28 so that it is always parallel to top 13 of the adjustable gauge rod).

Figure 2:
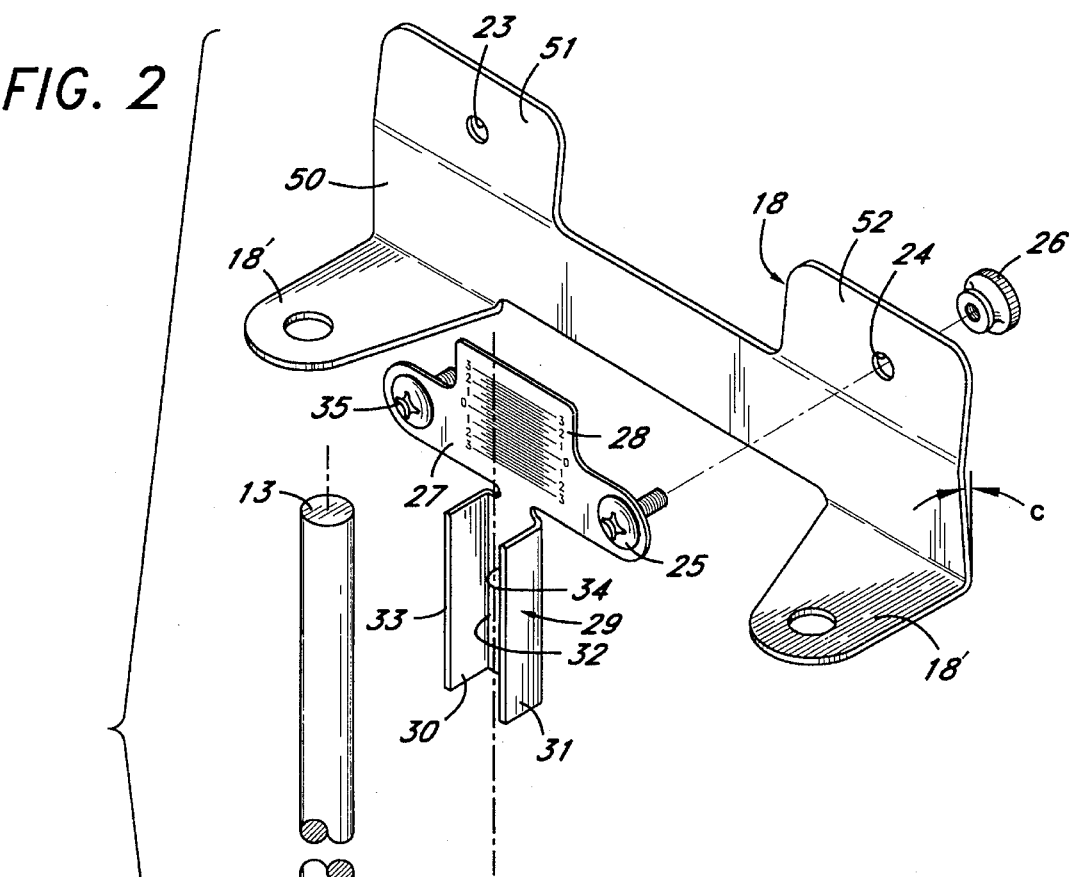
FIG. 2 is an exploded perspective view of the push rod gauge of FIG. 1.

Turning now to FIG. 2, the scale plate 27 can be seen to have indicia 28 etched on the surface thereof. An adjustable gauge rod holding channel 29 has a left side member 30, a right side member 31, and a channel base 32. Preferably the distance between left and right side members 30 and 31 is very accurately controlled. Preferably, the front edges 33 and 34 are slightly closer together than the main part of the member so that push rod will snap into the channel and then freely move up and down in the channel.

In use, the gauge is mounted as shown in FIG. 1 and adjustable gauge rod 12 is snapped into holding channel 29.

Figure 3:
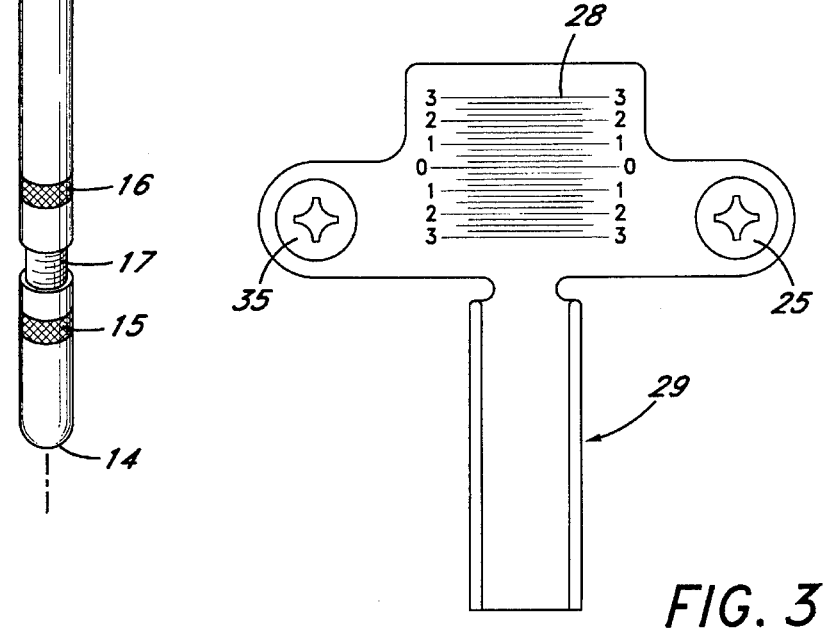
FIG. 3 is an enlarged front view of the scale plate of the push rod gauge of FIG. 2.

The rod 12 slides downwardly until the rounded lower end 14 contacts a cam shaft lobe in a manner analogous to that shown in FIGS. 4 through 9. The flat upper surface or top 13 lies adjacent the scale 28 and its position can be easily read. Next, the cam shaft is turned and rod 12 moves upwardly and downwardly as the cam shaft passes through a 360° turn. The gauge rod length is adjusted by turning the portions 15 and 16 of rod 12 and by trial and error, adjusting the length of rod 12 so that it moves an equal distance above and below the zero line shown in FIG. 3 of the drawings. Once this has been accomplished, the rod 12 is removed and the length measured. The actual push rod is then either adjusted or cut to this proper length.

Returning to FIG. 1, the gauge rod 12 is removed from its position shown in FIG. 1 and thumb nut 26 is unscrewed from screw 25 and scale 28 is disconnected from mounting bracket 18. Next, screw 35 (held to scale 28) is inserted through hole 23 and thumb nut 26 is inserted on it. Adjustable gauge rod 12 is again snapped in holding channel 29 and the exhaust push rod length is determined. This length is, of course, also carefully noted.

FIGS. 4, 5, and 6 show in a diagrammatic faction, the relationship between the push rod and the valve when the push rod has been adjusted to its proper length. The push rod 41 is of the type which may be adjusted in length as indicated generally at reference character 42. It has a hydraulic roller tappet 39 with a roller 40 which contacts the heel 38 of cam lobe 36. The nose of cam lobe 36 is indicated by reference character 37. The upper portion of push rod 41 is shown as the upper portion of adjustable gauge rod 12 which has a flat upper surface 13. A rocker arm 43 includes an adjustment 44 which is optional but preferred. A valve 45 is seated against valve seat 46 when the tappet 39 is contacting the heel 38 of cam lobe 36. The angle which the rocker arm 43 forms about its axis of rotation 47, is indicated by reference character "a" in FIG. 4.

As the cam lobe continues to turn as shown in FIG. 5, the roller tappet 39 rides up toward the nose 37 of cam lobe 36, and the upper end 13 of adjustable gauge rod 12 is in line with the zero line 48 of scale 28. At this point, the push rod is at one-half lift position, and the rocker arm is square.

Turning now to FIG. 6, the tappet 39 is contacting the nose 37 of cam lobe 36 and the valve 45 is fully opened. The angle between the rocker arm and the horizontal is indicated by reference character "b" and when properly adjusted as shown in FIG. 4, 5, and 6 is equal to angle "a" of FIG. 4. In this way, the valve timing is the most precise, the loading on the push rod and rocker arm is minimized which in turn reduces wear, increases RPM and power.

Figures analogous to 4, 5 and 6 are shown without the gauge in FIGS. 7, 8, and 9. This shows the valve movement and rocker arm movement with an accurately lengthened push rod 41. The angle "a" in FIG. 7, where the valve is closed, is the same as angle "b" in FIG. 9 when the valve is fully opened. In FIG. 8, the rocker arm is square at half lift.

While the push rod gauge of the present invention has been discussed largely in conjunction with a motorcycle engine, it is, of course, applicable to any push rod engine. The gauge permits an adjustment heretofore done only by guesswork and this adjustment is particularly critical for high performance push rod engines.

The push rod gauge of the present invention is also useful with engines which have pedestal mounted rocker arms. A gauge assembly useful for this purpose, is shown in FIGS. 10 and 11 of the drawings. An engine head 67 supports a pair of studs 68 and 69. Studs 68 and 69 normally support pedestal mounted rocker arms which have been removed. An adjustable gauge rod 12 is inserted in push rod opening 54 in head 67. Next, the support bracket 55 is placed over stud 68. Support bracket 55 has an opening 64 which is larger than stud 68 so that it may be slipped loosely over stud 68. An adjustment screw 56 is threadably secured in threaded opening 57 of support bracket 55 as shown best in FIG. 11. A tightening nut 58 is provided to secure adjustment screw 56 in a preferred position as described more fully below.

A scale member 59 has a channel 60 along which the adjustable gauge rod 12 rides. A hole 61 permits the scale member 59 to be held to the support bracket 55 by threading screw 62 into threaded opening 63 in support bracket 55.

After the support bracket 55 has been slipped over stud 68, the assembly is shown in side view FIG. 11. There it can be seen that rocker stud 68 is positioned in cylindrical passageway 64 which is large enough to permit support bracket 55 to move up and down along rocker stud 68. Adjustment screw 56 has a marker 65 and support bracket 55 has a scale 66. Adjustment screw 56 is adjusted up or down so that marker 65 is aligned with the desired number on scale 66. This positions support bracket 55 at the proper height. The selection of number on scale 66 is a measure of the valve lift desired for the valve 53. Next, the adjustable gauge rod 12 is inserted in channel 60 and through opening 54 so that its lower end (not shown) contacts the cam shaft. Then, the engine is turned so that the adjustable gauge rod 12 moves upwardly and downwardly along scale member 59. Then the length of adjustable gauge rod 12 is selected so that adjustable gauge rod 12 moves an equal distance above and below the zero line on scale member 59. This then provides an accurate measure of the proper push rod length to provide the desired lift.

Further modifications may be necessary for different engine configurations but the basic elements are the same and such adjustments would be well within the ability of one skilled in the engine tuning art.

Although an actual push rod may be used to make the length measurement, it would also be possible to have any measuring rod which would preferably be adjustable in length to determine the optimum length of a push rod which could then be cut or otherwise adjusted to the proper length.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A push rod gauge affixed to an engine for finding the optimum length of push rods for use in a push rod engine of the type which has a cylinder head, a cam shaft, said push rod gauge comprising:

a push rod with an upper end and a smooth cylindrical portion near said upper end;

a mounting bracket affixed to said cylinder head, said mounting bracket having a base with means for securement to a cylinder head, and said mounting bracket having a face plate;

a push rod holding channel held by said face plate of said mounting bracket, said push rod holding channel holding the smooth cylindrical portion of said push rod; and measuring indicia visually allignable with the upper end of said push rod, said measuring indicia including an optimum half lift measuring mark and a plurality of marks on both sides of said optimum half lift measuring mark, said measuring indicia positioned above said push rod holding channel whereby the vertical position of the upper end of said push rod may be determined by observing its position along the measuring indicia as the cam shaft of an engine is turned.

2. The push rod gauge of claim 1 wherein said measuring indicia includes a zero line and there are an equal number of measuring indicia above and below said zero line.

3. The push rod gauge of claim 1 wherein the push rod holding channel is held by a separate scale plate held by said mounting bracket, which scale plate has said measuring indicia positioned above said push rod holding channel.

4. The push rod gauge of claim 3 where the scale plate and holding channel are formed from a single metal plate and said push rod holding channel is formed by bending a right side member and a left side member adjacent a channel base.

5. The push rod gauge of claim 4 wherein said channel base and that portion of said scale plate which contains said indicia are in the same plane.

6. The push rod gauge of claim 3 wherein said scale plate has a right side mounting hole and a left side mounting hole and said mounting bracket also has a right side mounting hole and a left side mounting hole and the scale plate is held to the mounting bracket by a removable screw and nut which screw passes through one of said fight and left side mounting holes of said scale plate and a corresponding one of said right and left side mounting holes of said mounting plate.

7. A push rod gauge affixed to the head of an engine having a head, a cam shaft, a plurality of push rods each having a longitudinal axis, said push rod gauge comprising:

a mounting bracket affixed to the head of said engine, said mounting bracket having means for removable attachment to the head of said engine;

means for slidably holding a push rod having a central axis, said means for slidably holding a push rod being positioned on said mounting bracket so that the longitudinal axis of a push rod of said engine will lie along the central axis of said means for slidably holding a push rod and wherein the means for slidably holding a push rod is a channel having a right side member, a left side member, generally parallel to the right side member and a channel base and wherein said right side member and said left side member are slightly inclined toward each other so that a push rod may be snapped into said channel and the push rod may slide up and down without binding against the channel; and measuring indicia comprising a plurality of parallel straight lines positioned adjacent and above said means for slidably holding a push rod and said plurality of parallel straight lines being at a 90 degree angle with respect to the central axis of the means for slidably holding a push rod, whereby when the cam shaft of said engine is turned, the position of the top of a push rod, held in said means for slidably holding a push rod, can be measured against the measuring indicia.

8. The push rod gauge of claim 7 wherein said means for slidably holding a push rod is held on a separate scale plate removably attachable to said mounting bracket.

9. The push rod gauge of claim 8 wherein said separate scale plate has a right side mounting hole and a left side mounting hole and said mounting bracket also has a right side mounting hole and a left side mounting hole and the scale plate is held to the mounting bracket by a removable screw and nut which screw passes through one of said right and left side mounting holes of said scale plate and a corresponding one of said right and left side mounting holes of said mounting plate.

10. A push rod gauge for finding the optimum length of push rods for use in a push rod engine of the type which has a cylinder head, a pedestal mounted rocker mounted on a rocker stud supported by said engine head, a plurality of valves each having a valve stem top, and a cam shaft, said push rod gauge comprising:

a mounting bracket affixable to a cylinder head by being affixed on said rocker stud from which the rocker has been removed said mounting bracket having a face plate held thereby;

a push rod measuring member, comprising an elongated rod having a top end and a bottom end;

a push rod holding channel held by said face plate, said push rod holding channel being of sufficient width to slidingly hold the push rod measuring member; and measuring indicia positioned on said face plate above said push rod holding channel said measuring indicia being visually allignable with the top of said push rod measuring member and said measuring indicia including an optimum half lift measuring mark and said measuring indicia including a plurality of marks on both sides of said optimum half lift measuring mark whereby the vertical position of the top end of said push rod measuring member may be determined by observing the position of the top end with respect to the measuring indicia as the cam shaft of the engine is turned.

11. The push rod gauge of claim 10 wherein said mounting bracket has a cylindrical opening which fits over the rocker stud.

12. The push rod gauge of claim 11 wherein said holding bracket further includes adjustment means adjustably held by said bracket, said adjustment means having a foot which contacts the valve stem top and said adjustment means also having a marker and said holding bracket has a second scale adjacent the second scale of said adjustment means whereby the position of the adjustment means may be adjusted so that the marker of the adjustment means aligns with the desired indicia on said scale which, in turn, positions the holding bracket on said rocker stud.

13. The push rod gauge of claim 12 wherein said adjustment means is a threaded screw held in a threaded hole in said holding bracket.

14. A process for determining the optimum length of a push rod for use with a push rod engine of the type having a plurality of push rods, rocker arms, a cylinder head, a plurality of valves and a cam shaft supporting a plurality of cams, said process comprising:

removing at least one push rod and at least one rocker arm from the engine leaving an exposed push rod passageway;

supporting a push rod gauge above the exposed push rod passageway, said push rod gauge having indicia indicating an optimum one-half lift measuring mark and indicia on both sides of said measuring mark, said indicia comprising an indicia area;

placing a push rod measuring member into said push rod passageway so that a lower end thereof contacts a cam and an upper end thereof extends above said push rod passageway and adjacent said indicia area;

turning said cam shaft; and measuring the distance above and below said half cam lift measuring mark as the upper end of the push rod measuring member moves up and down to provide data to determine the optimum push rod length.

* * * * *